(12) United States Patent
Matsumiya et al.

(10) Patent No.: US 7,268,894 B2
(45) Date of Patent: Sep. 11, 2007

(54) IMAGE MEASURING METHOD, IMAGE MEASURING SYSTEM AND IMAGE MEASURING PROGRAM

(75) Inventors: Sadayuki Matsumiya, Sagamihara (JP); Hirato Sonobe, Miyazaki (JP); Koichi Komatsu, Yamato (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/437,697

(22) Filed: May 22, 2006

(65) Prior Publication Data

US 2006/0274328 A1 Dec. 7, 2006

(30) Foreign Application Priority Data

Jun. 3, 2005 (JP) .............................. 2005-164603

(51) Int. Cl.
*G01B 11/24* (2006.01)
(52) U.S. Cl. .................................................... 356/601
(58) Field of Classification Search ................ 356/121, 356/601–613, 620, 622, 154; 382/151, 165
See application file for complete search history.

(56) References Cited

U.S. PATENT DOCUMENTS

| | | | | |
|---|---|---|---|---|
| 5,122,648 A | * | 6/1992 | Cohen et al. ............ 250/201.3 |
| 5,446,548 A | * | 8/1995 | Gerig et al. ................ 356/620 |
| 5,852,672 A | * | 12/1998 | Lu .............................. 382/154 |
| 6,131,301 A | | 10/2000 | Sutherland |
| 2003/0222197 A1 | * | 12/2003 | Reese et al. ................ 250/206 |
| 2004/0103548 A1 | | 6/2004 | Jordil et al. |
| 2004/0156054 A1 | | 8/2004 | Christoph |
| 2006/0227336 A1 | * | 10/2006 | Dinner et al. ............... 356/601 |

FOREIGN PATENT DOCUMENTS

EP 0 599 513 A1 6/1994

\* cited by examiner

*Primary Examiner*—Tarifur Chowdhury
*Assistant Examiner*—Isiaka O Akanbi
(74) *Attorney, Agent, or Firm*—Oliff & Berridge, PLC (57) ABSTRACT

An image measuring method comprises making no stop of an imaging means relative to a measurement stage at measurement positions (MP1-MP3), and capturing instantaneous images to acquire information required for measurement. A first direction to a measurement position (MP1) to be measured next and a second direction from the measurement position (MP1) to a next measurement position (MP2) form an angle therebetween. If this angle exceeds a certain angle, an overshoot path is formed at a location beyond the measurement position (MP1) in the first direction. The larger the angle formed between the first direction and the second direction, the lower the measurement speed at the measurement position (MP1) is made.

12 Claims, 6 Drawing Sheets

| Corner Angle (°) | Maximum Speed (mm/s) | Overshoot (mm) |
|---|---|---|
| 0 | Limitless | 0 |
| 5 | 20 | 0.1 |
| 10 | 15 | 0.15 |
| ⋮ | ⋮ | ⋮ |
| 45 | 10 | 0.3 |
| ⋮ | ⋮ | ⋮ |
| 90 | 5 | 0.5 |
| ⋮ | ⋮ | ⋮ |

IMAGE MEASURING METHOD, IMAGE MEASURING SYSTEM AND IMAGE MEASURING PROGRAM

CROSS REFERENCE TO RELATED APPLICATION

This application is based upon and claims the benefit of priority from the prior Japanese Patent Application No. 2005-164603, filed on Jun. 3, 2005, the entire contents of which are incorporated herein by reference.

BACKGROUND OF THE INVENTION

1. Field of the Invention

The present invention relates to an image measuring method, image measuring system and image measuring program, having a non-stop measurement mode for image measurement, in which an imaging means moves relative to a measurement target supported on a measurement stage and captures instantaneous image information at designated measurement positions without making a stop.

2. Description of the Related Art

Figure 8:
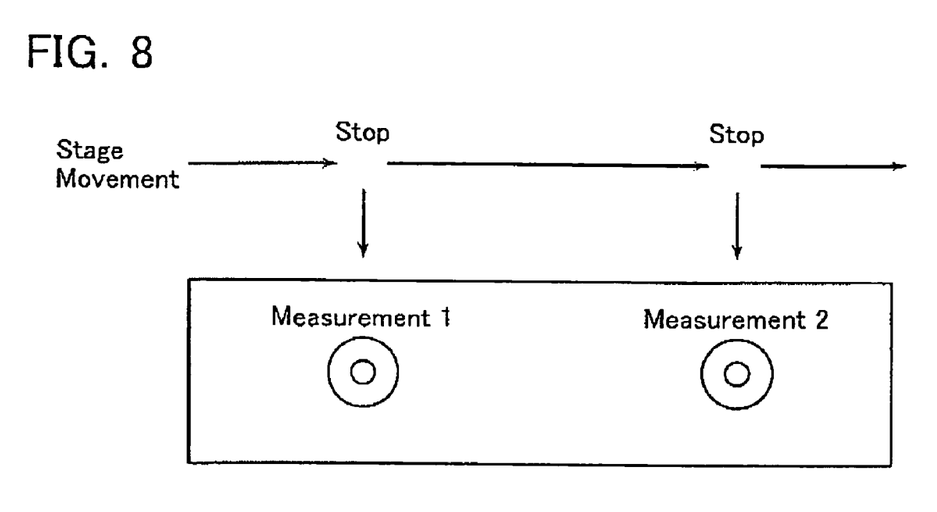
FIG. 8 is an illustrative view of measurement in a standard measurement mode.

A conventional CNC image measuring machine comprises a measurement stage, which is moved relative to an imaging means such as a CCD camera and stopped at a measurement position as shown in FIG. 8. Then, the amount of illuminating light is adjusted to acquire image information about a measurement target. To the acquired image information, image processing such as setting of a measuring tool and edge detection is applied, thereby executing a measurement at one measurement position. This measurement is repeated as Measurement 1, Measurement 2, . . . and so on for all measurement positions to achieve measurements at required positions (hereinafter, such the measurement mode is referred to as a "standard measurement mode").

Figure 9:
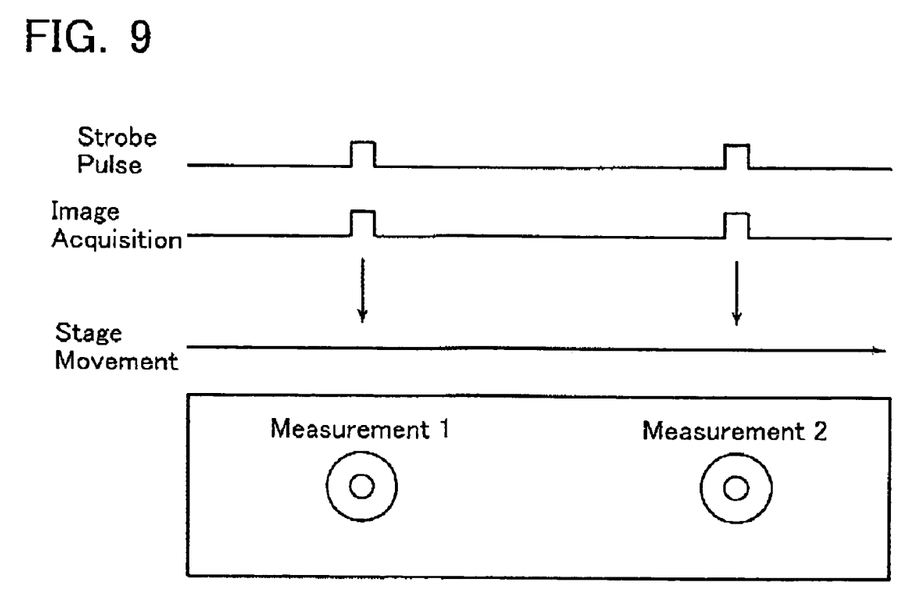
FIG. 9 is an illustrative view of measurement in a non-stop measurement mode.

In contrast, for the purpose of improving the throughput of measurement, a measurement may be performed without making a stop of the measurement stage relative to the imaging means even at a measurement position in a measurement mode (hereinafter, such the measurement mode is referred to as a "non-stop measurement mode"). An image measuring machine having such the non-stop measurement mode has been proposed (see JP-A 2004-535587, paragraphs 0005-0006, FIG. 2). This image measuring machine irradiates the measurement target with strobe illumination, as shown in FIG. 9, without making a stop of the measurement stage at measurement positions. Alternatively, it captures instantaneous image information imaged using a shuttered CCD camera, for image measurement. In the image measuring machine, the CCD camera is roughly positioned in a measurement region at high speeds and then decelerated to capture images within a predetermined constant speed region.

The above-described conventional image measuring machine has no problem if multiple positions to be measured are arranged in a straight line. In contrast, if the multiple positions are not arrayed in a straight line, on measurement in a non-stop measurement mode, a measurement position may appear at a folded point on a movement path of the imaging means. Therefore, a movement mechanism is overloaded and a problem may arise associated with a blown protective fuse depending on the case. In addition, the movement mechanism may cause vibrations and worsen the measurement accuracy as a problem.

SUMMARY OF THE INVENTION

The present invention has been made in consideration of such the problems and has an object to provide an image measuring method, image measuring system and image measuring program capable of preventing the measurement accuracy from lowering and the movement mechanism from being overloaded.

To achieve the above object, the present invention provides an image measuring method for image measurement including moving an imaging means relative to a measurement target supported on a measurement stage and capturing instantaneous image information about the measurement target at each of multiple measurement positions without making a stop of the imaging means. The method comprises forming an overshoot path, when the imaging means moves in a first direction to a first measurement position to be measured next and in a second direction from the first measurement position to a next measurement position or a second measurement position, and if an angle formed between the first direction and the second direction exceeds a certain angle, such that the imaging means, after passing through the first measurement position in the first direction, moves a certain distance in the first direction; and lowering a relative movement speed of the imaging means to the measurement stage at the first measurement position as the angle formed between the first direction and the second direction becomes larger.

The present invention also provides an image measuring system for image measurement including moving an imaging means relative to a measurement target supported on a measurement stage and capturing instantaneous image information about the measurement target at each of multiple measurement positions without making a stop of the imaging means. The system comprises a means operative to indicate the multiple measurement positions; a movement path/speed determining means operative to determine a relative movement path and a relative movement speed of the imaging means to the measurement stage based on the multiple measurement positions indicated by the preceding means; and a means operative to move the imaging means relative to the measurement stage based on the relative movement path and the relative movement speed determined at the movement path/speed determining means. The movement path/speed determining means determines the relative movement path and the relative movement speed so as to form an overshoot path, when the imaging means moves in a first direction to a first measurement position to be measured next and in a second direction from the first measurement position to a next measurement position or a second measurement position, and if an angle formed between the first direction and the second direction exceeds a certain angle, such that the imaging means, after passing through the first measurement position in the first direction, moves a certain distance in the first direction, and to lower the relative movement speed of the imaging means to the measurement stage at the first measurement position as the angle formed between the first direction and the second direction becomes larger.

The present invention further provides an image measuring program for instructing a computer to execute image measurement including moving an imaging means relative to a measurement target supported on a measurement stage and capturing instantaneous image information about the measurement target at each of multiple measurement positions without making a stop of the imaging means. The program comprises steps of forming an overshoot path, when the imaging means moves in a first direction to a first measurement position to be measured next and in a second direction from the first measurement position to a next measurement position or a second measurement position, and if an angle formed between the first direction and the second direction exceeds a certain angle, such that the imaging means, after passing through the first measurement position in the first direction, moves a certain distance in the first direction; and lowering a relative movement speed of the imaging means to the measurement stage at the first measurement position as the angle formed between the first direction and the second direction becomes larger.

In the present invention, the imaging means may move in a first direction to a first measurement position to be measured next and in a second direction from the first measurement position to a next measurement position or a second measurement position. In this case, if an angle formed between the first direction and the second direction exceeds a certain angle, an overshoot path is formed from the first measurement position in the first direction. Therefore, it is possible to prevent the first measurement position from appearing at a folded point on a movement path, thereby preventing the measurement accuracy from worsening.

In the present invention, the relative movement speed of the imaging means to the measurement stage at the first measurement position is lowered as the angle formed between the first direction and the second direction becomes larger. Therefore, it is possible to prevent the movement mechanism from being overloaded at a folded point on the movement path.

BRIEF DESCRIPTION OF THE DRAWINGS

Preferred embodiments of the present invention will now be described below with reference to the accompanying drawings, in which.

DETAILED DESCRIPTION OF THE INVENTION

Embodiments of the present invention will be described next based on the accompanying drawings.

EMBODIMENT 1

Figure 1:
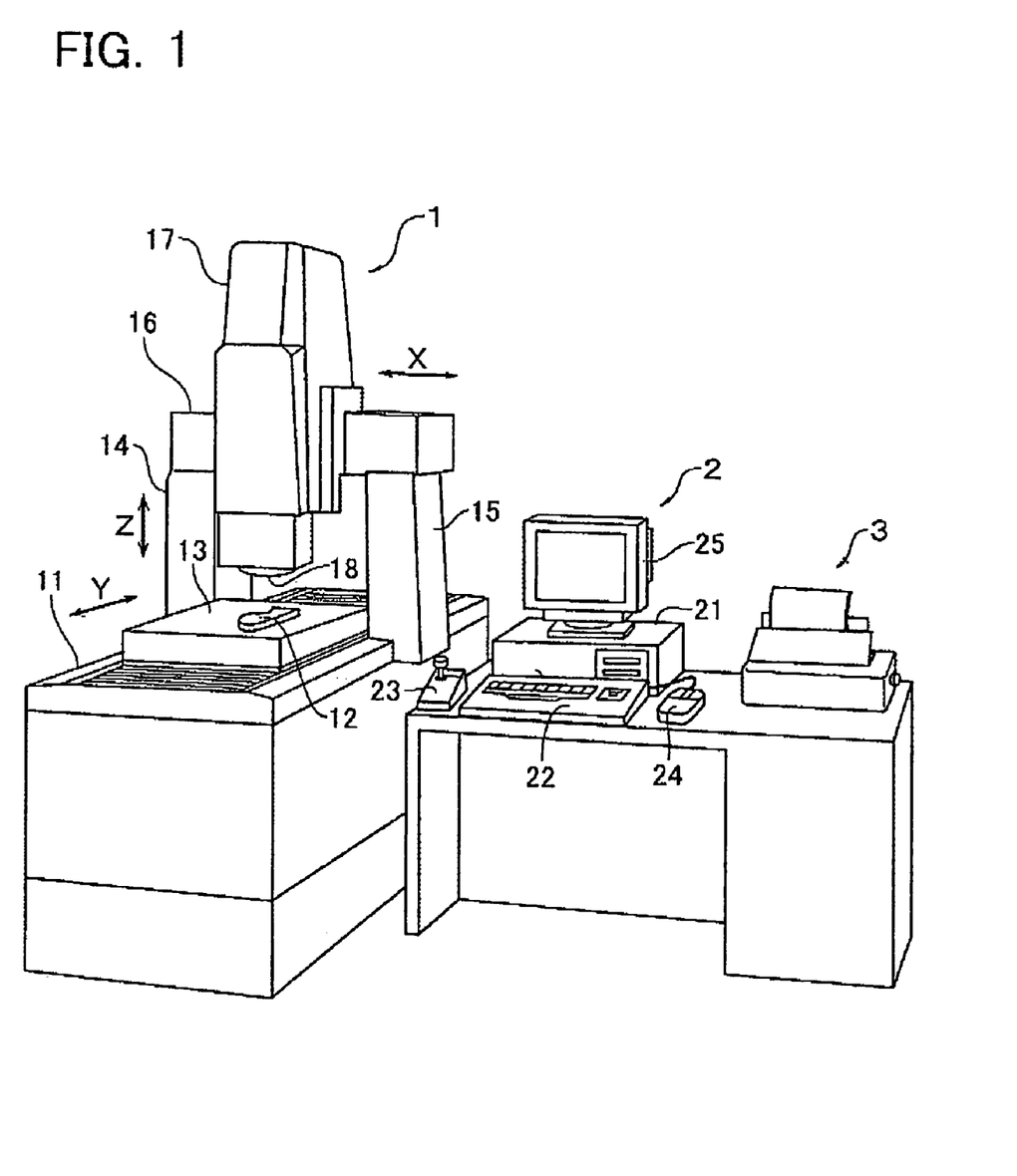
FIG. 1 is an external perspective view showing a configuration of an image measuring system according to an embodiment of the present invention.

FIG. 1 is a perspective view showing an entire configuration of an image measuring system according to an embodiment of the present invention. This system comprises a non-contact image measuring machine 1, a computer system 2 operative to drive/control the image measuring machine 1 and execute required data processing, and a printer 3 operative to print out a measurement result.

The image measuring machine 1 is configured as follows. A table 11 is provided and a measurement stage 13 is installed thereon to receive a measurement target (hereinafter referred to as a work) 12 mounted thereon. The measurement stage 13 is driven in the Y-axis direction by a Y-axis drive mechanism, not shown. Fixed at the central portion between both edges of the table 11 are support arms 14, 15 extending upward. An X-axis guide 16 is fixed to the support arms 14, 15 to link both upper ends thereof. An imaging unit 17 is supported on the X-axis guide 16. The imaging unit 17 is driven along the X-axis guide 16 by an X-axis drive mechanism, not shown. A CCD camera 18 is installed on a lower end of the imaging unit 17 as opposed to the measurement stage 13. The imaging unit 17 contains an illuminator and a focusing mechanism, not shown, as well as a Z-axis drive mechanism operative to shift the position of the CCD camera 18 in the Z-axis direction.

Figure 2:
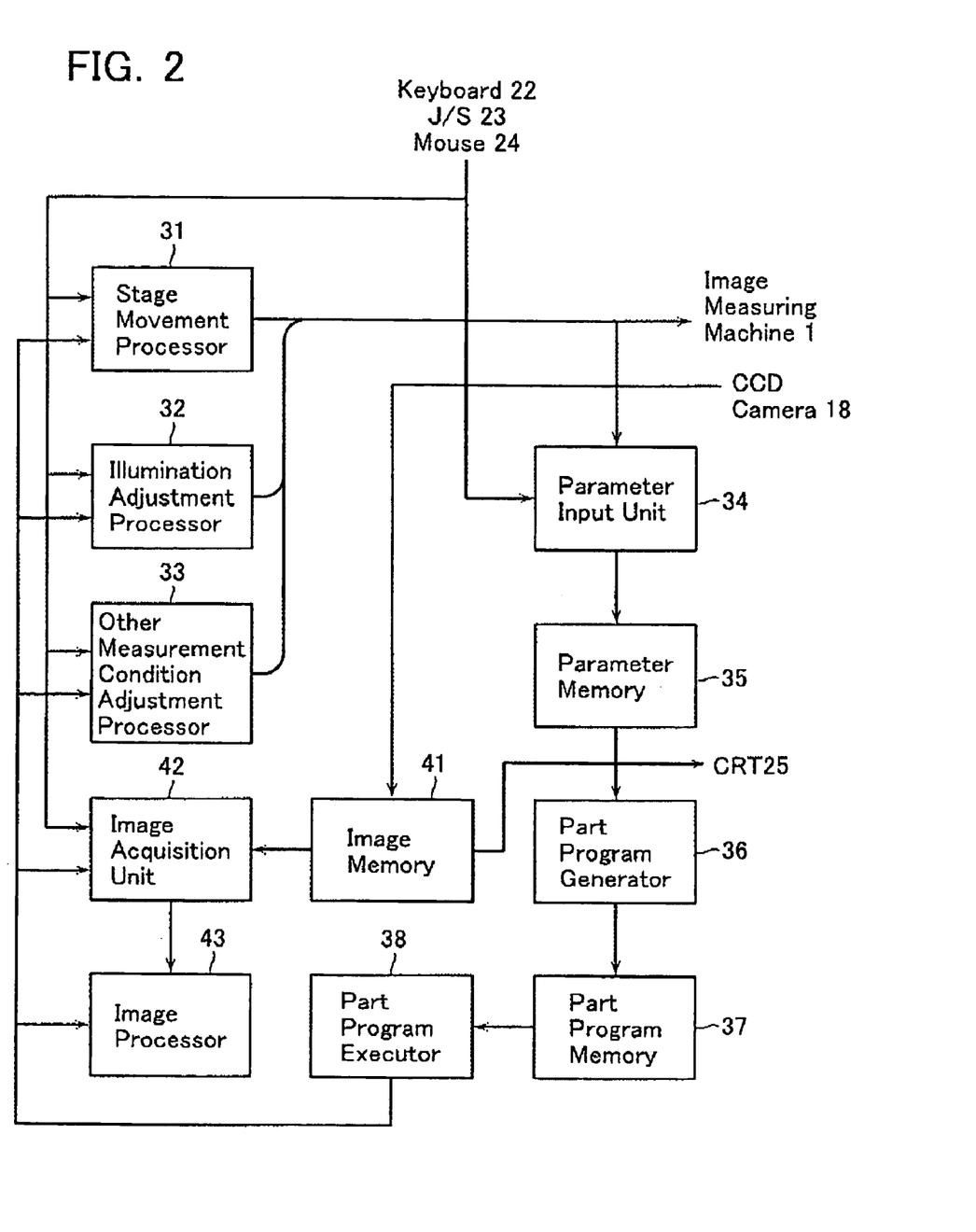
FIG. 2 is a functional block diagram of a computer in the same measuring system.

The computer system 2 includes a computer body 21, a keyboard 22, a joystick box (hereinafter referred to as J/S) 23, a mouse 24, and a display unit 25. The computer body 21 realizes various functions as shown in FIG. 2 together with certain programs stored therein.

It includes a stage movement processor 31 for controlling the image measuring machine 1 based on an instruction input from input means such as the keyboard 22, the J/S 23 and the mouse 24; an illumination adjustment processor 32; and an other measurement condition adjustment processor 33. The stage movement processor 31 controls the XYZ-axes drive mechanisms in the image measuring machine 1 based on a stage movement instruction input from input means to shift the position of the CCD cameral 18 relative to the measurement stage 13. At the time of teaching, the illumination adjustment processor 32 flashes the illuminator in the image measuring machine 1 as a strobe light at a certain cycle successively and adjusts the pulse width of the strobe light based on an illumination adjustment instruction input from input means. In a non-stop measurement mode, it flashes the strobe light with a predetermined pulse width at designated measurement positions. The other measurement condition adjustment processor 33 adjusts other measurement conditions such as lens magnification and focusing adjustment based on instruction inputs for other measurement condition adjustments.

The stage position, the information about the pulse width of the strobe light and the information about the other measurement conditions adjusted at the processors 31-33 are fetched into a parameter input unit 34 based on a certain instruction input from input means. The parameter fetched in the parameter input unit 34 is stored in a parameter memory 35. A part program generator 36 uses the parameter stored in the parameter memory 35 to generate a part program for measurement. If input means instructs a non-stop measurement mode, the part program generator 36 generates a part program for the non-stop measurement mode. The generated part program is stored in a part program memory 37.

A part program executor 38 is operative to read a required part program out of the part program memory 37 and execute it. In accordance with various commands described in the part program, the part program executor drives the stage movement processor 31, the illumination adjustment processor 32, the other measurement condition adjustment processor 33, an image acquisition unit 42 and an image processor 43 appropriately. The pieces of image information imaged at the CCD camera 18 are sequentially stored in an image memory 41. The pieces of image information stored in image memory 41 are sequentially displayed on the display unit 25 and captured by the image acquisition unit 42 as still images based on the part program. To the image information acquired at the image acquisition unit 42, the image processor 43 executes image processing for image measurement, such as setting of a measuring tool, detection of edges, and detection of coordinates.

A measurement operation of the image measuring system according to the embodiment thus configured is described next.

Figure 3:
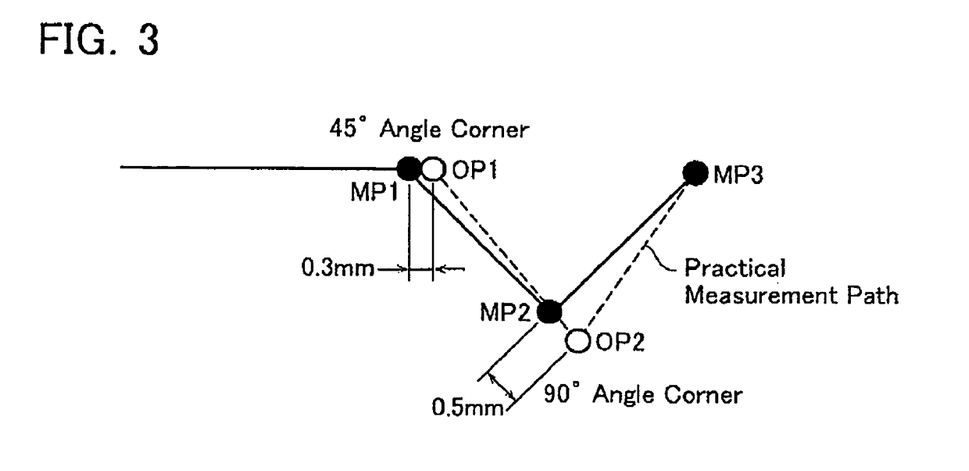
FIG. 3 shows an example of a measurement path in the same measuring system.

FIG. 3 shows an example of a movement path of the measurement stage 13 in the presence of three measurement positions (MP1, MP2, MP3). The three measurement positions MP1-MP3 are not arrayed in a straight line. A direction of movement from the current position of the CCD camera 18 relative to the measurement stage 13 toward the measurement position MP1 and a direction of movement from the measurement position MP1 toward the next measurement position MP2 form an angle of 45° therebetween. Similarly, the direction of movement from the measurement position MP1 toward the next measurement position MP2 and a direction from the measurement position MP2 toward the next measurement position MP3 form an angle of 90° therebetween.

Figure 4:
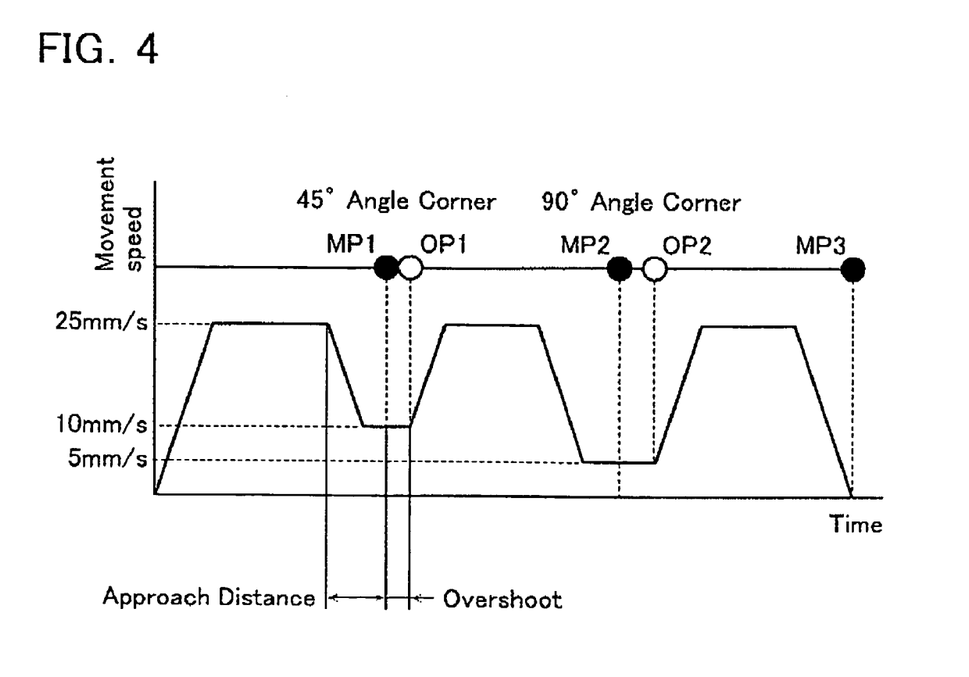
FIG. 4 shows an example of a speed pattern on the same measurement path.

FIG. 4 shows an example of a speed pattern of the measurement table 13 on the above movement path.

This system limits the maximum speed depending on the angle at a folded point. For example, a speed pattern may be set as partly speed-limited as including an initial measurement speed unchanged at a 0° angle (straight line), 10 mm/s at the 45° angle corner, and 5 mm/s at the 90° angle corner.

The overshoots beyond the measurement positions MP1, MP2, MP3 are made variable depending on the angle at the folded point. For example, the overshoot may be set at 0.3 mm beyond the 45° angle corner, and 0.5 mm beyond the 90° angle corner. Therefore, a practical measurement path shapes a path folded at overshoot points OP1, OP2 as shown with the dotted line in FIG. 3.

This makes it possible to prevent the vibrations of the measurement positions MP1, MP2, MP3 and perform accurate measurements.

Figure 5:
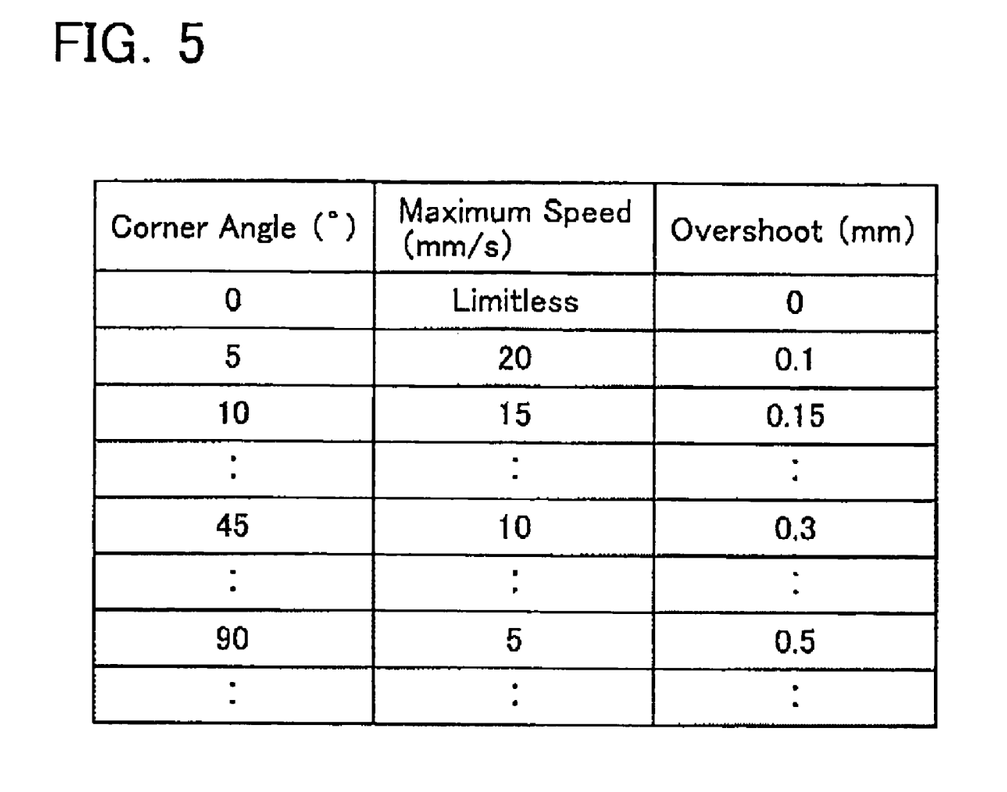
FIG. 5 shows an example of a path/speed table in the same system.

To realize the above operation, the part program generator 36 includes a movement path/speed determining means (routine). The movement path/speed determining means contains a path/speed table as shown in FIG. 5, which may be used to previously register maximum speeds and overshoots relative to corner angles (angles at folded points) on a movement path. When input means indicates measurement positions, the movement path/speed determining means interconnects the measurement positions to create a movement path, calculates angles at the measurement positions on the movement path, and refers to the path/speed table by the angles for the maximum speeds and overshoots. In this embodiment, when the angle is less than 5°, the speed is determined limitless and the overshoot zero, for example.

For convenience of description, a "movement speed" in a fast movement region other than the measurement region is herein distinguished from the "measurement speed" in the measurement region. This system controls the speed as shown in FIG. 4 by decelerating from the movement speed to the measurement speed for passing through the measurement positions MP1-MP3, then maintaining the measurement speed also in the period of overshoot, thereby achieving zero acceleration at the measurement positions MP1-MP3. This makes it possible to achieve a high-accuracy measurement. An approach distance is determined at the movement path/speed determining means taking the movement speed and the measurement speed into account.

EMBODIMENT 2

Figure 6A:
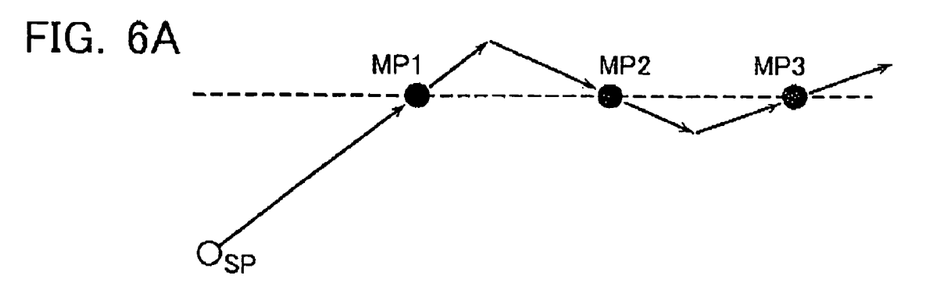
FIG. 6A and FIG. 6B show an example of a measurement path in another embodiment of the present invention.
Figure 6B:
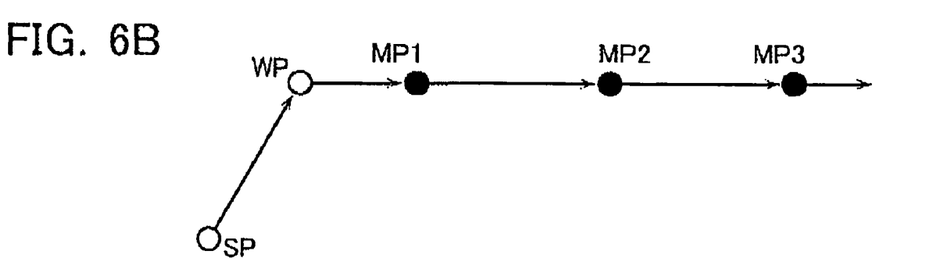

Each of FIG. 6A and FIG. 6B is an illustrative view of another embodiment of the present invention.

FIG. 6A shows an example of the measurement path, which is shaped zigzag in consideration of overshoots because the measurement positions MP1-MP3 are arrayed in a straight line though a measurement starting point SP is not arrayed in the same straight line accidentally.

Figure 7:
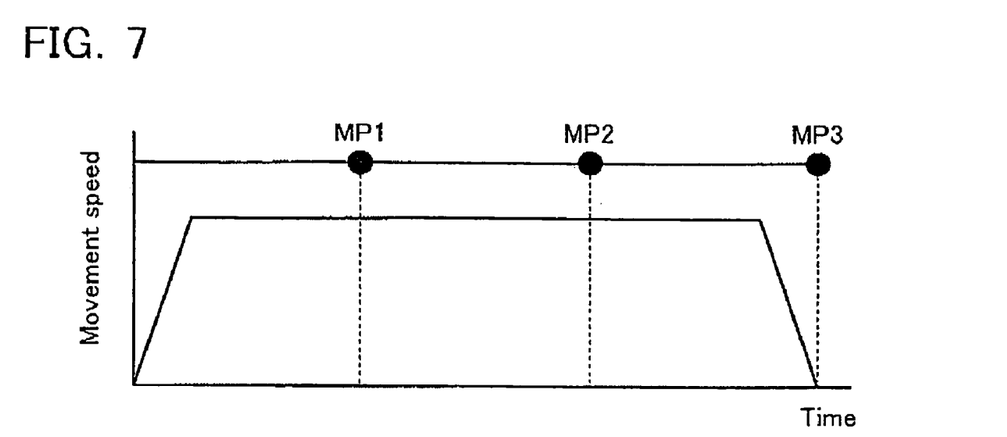
FIG. 7 shows a speed pattern on the same measurement path.

In such the case, as shown in FIG. 6B, a way point (a passing point) WP can be set, which is not involved in the measurement operation. To the way point WP, no overshoot path is added. The maximum speed at the way point WP can be limited, if required, thereby allowing the measurement path to run in a straight line. Such the setting allows a measurement to be performed with no deceleration at all the measurement positions MP1-MP3 (that is, at the measurement speed) as shown in FIG. 7. The instruction of such the way point WP is also effective in the presence of a position where it is intended to avoid an interference on the measurement stage.

The above system requires no limitation to be imposed on the arrangement locations of the measurement positions and the order of measurement. In addition, regardless of arrangement of the measurement positions, the angle formed between a path determined from a measurement position and a next measurement position and a next path is used to automatically calculate the speed and the overshoot. Therefore, a measurement can be performed accurately without overloading the machine. Further, a stable and accurate measurement can be achieved effectively within one path.

What is claimed is:

1. An image measuring method for image measurement including moving an imaging means relative to a measurement target supported on a measurement stage and capturing instantaneous image information of the measurement target at each of multiple measurement positions without stopping the imaging means, the method comprising:
    forming an overshoot path, when the imaging means moves in a first direction to a first measurement position and in a second direction different from the first measurement position to a second measurement position, the imaging means moves past the first measurement position in the first direction if an angle formed between the first direction and the second direction exceeds a certain angle; and
    lowering a movement speed of the imaging means relative to the measurement stage at the first measurement position as the angle formed between the first direction and the second direction becomes larger.

2. The image measuring method according to claim 1, comprising increasing a length of the overshoot path as the angle formed between the first direction and the second direction becomes larger.

3. The image measuring method according to claim 1, comprising providing an approach having a certain distance to the first measurement position in the first direction to unify the movement speed of the imaging means relative to the measurement stage before and after the first measurement position.

4. The image measuring method according to claim 1, comprising entering information indicating a way point of the imaging means relative to the measurement stage, and determining a movement path of the imaging means relative to the measurement stage to pass through the way point.

5. An image measuring system for image measurement including moving an imaging means relative to a measurement target supported on a measurement stage and capturing instantaneous image information of the measurement target at each of multiple measurement positions without stopping the imaging means, the system comprising:

a means operative to indicate the multiple measurement positions;

a movement path/speed determining means operative to determine a movement path and a movement speed of the imaging means relative to the measurement stage based on the multiple measurement positions; and a means operative to move the imaging means relative to the measurement stage based on the movement path and the movement speed, wherein the movement path/speed determining means determines the movement path and the movement speed to form an overshoot path, when the imaging means moves in a first direction to a first measurement position to be measured and in a second direction from the first measurement position to a second measurement position, the imaging means moving past the first measurement position in the first direction if an angle formed between the first direction and the second direction exceeds a certain angle and lowering the movement speed relative to the measurement stage at the first measurement position as the angle formed between the first direction and the second direction becomes larger.

6. The image measuring system according to claim 5, wherein the movement path/speed determining means determines the movement path to increase a length of the overshoot path as the angle formed between the first direction and the second direction becomes larger.

7. The image measuring system according to claim 5, wherein the movement path/speed determining means provides an approach having a certain distance to the first measurement position in the first direction to unify the movement speed of the imaging means relative to the measurement stage before and after the first measurement position.

8. The image measuring system according to claim 5, further comprising a means operative to indicate a way point of the imaging means relative to the measurement stage, wherein the movement path/speed determining means determines the movement path of the imaging means relative to the measurement stage to pass through the way point.

9. An image measuring program for instructing a computer to execute image measurement including moving an imaging means relative to a measurement target supported on a measurement stage and capturing instantaneous image information about the measurement target at each of multiple measurement positions without stopping the imaging means, the program comprising steps of:

forming an overshoot path, when the imaging means moves in a first direction to a first measurement position to be measured and in a second direction from the first measurement position to a second measurement position, the imaging means moving past the first measurement position in the first direction if an angle formed between the first direction and the second direction exceeds a certain angle; and lowering a movement speed of the imaging means relative to the measurement stage at the first measurement position as the angle formed between the first direction and the second direction becomes larger.

10. The image measuring program according to claim 9, comprising instructing the computer to increase a length of the overshoot path as the angle formed between the first direction and the second direction becomes larger.

11. The image measuring program according to claim 9, comprising instructing the computer to provide an approach having a certain distance to the first measurement position in the first direction to unify the movement speed of the imaging means relative to the measurement stage before and after the first measurement position.

12. The image measuring program according to claim 9, comprising instructing the computer to receive information indicating a way point of the imaging means relative to the measurement stage, and determining a movement path of the imaging means relative to the measurement stage to pass through the received way point.

* * * * *